Nov. 13, 1956  R. A. McCALLUM  2,770,377
SUSPENSION FOR VEHICLES SUCH AS SHUTTLE CARS
Filed March 26, 1954  5 Sheets-Sheet 1
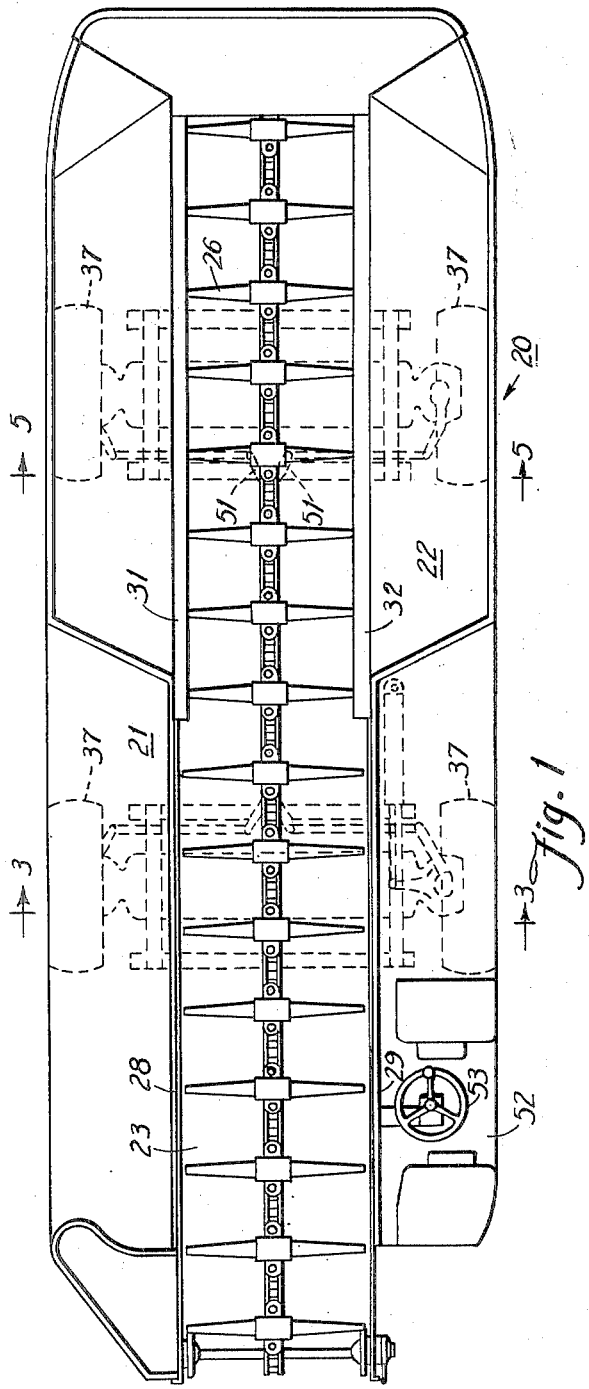
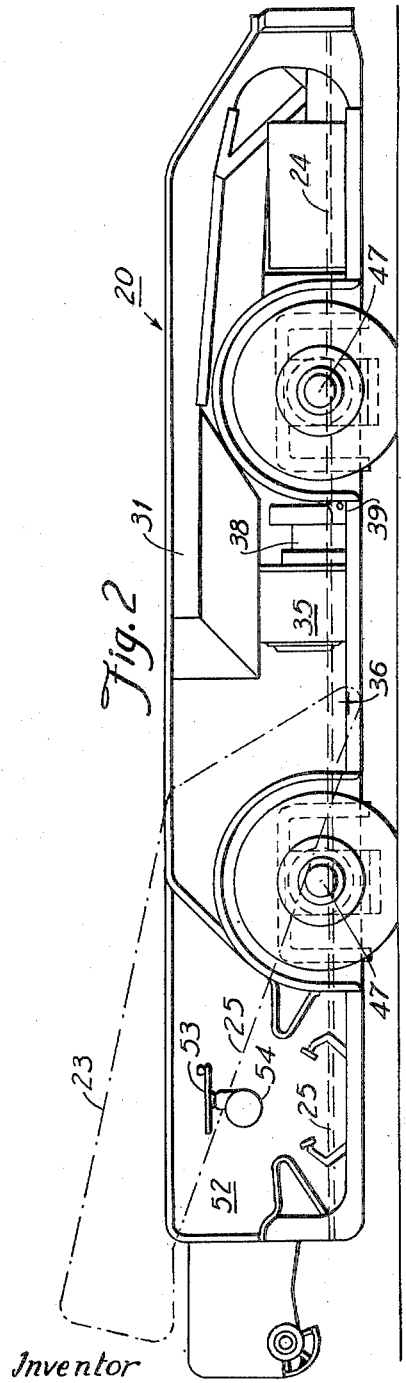
Inventor
Robert A. McCallum
By Murray A. Gleeson
Attorney

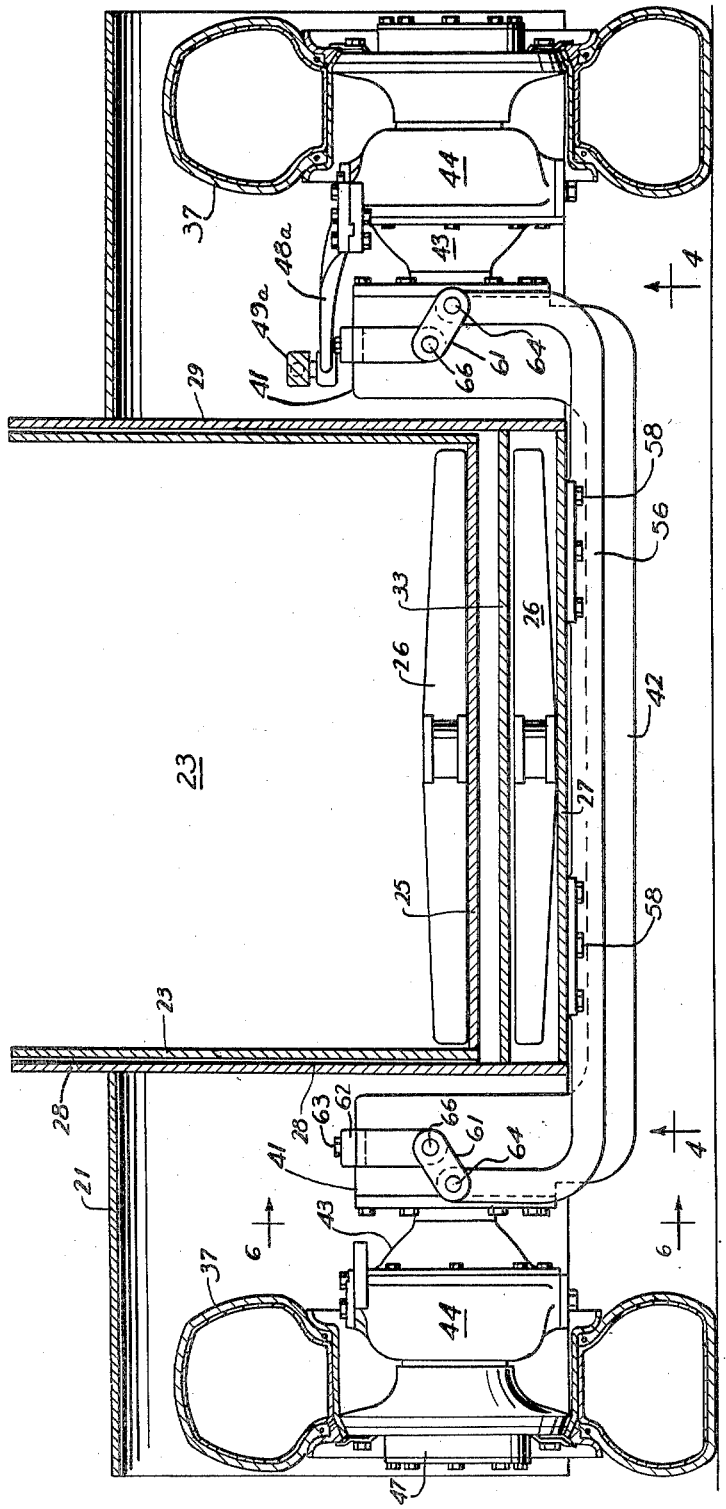

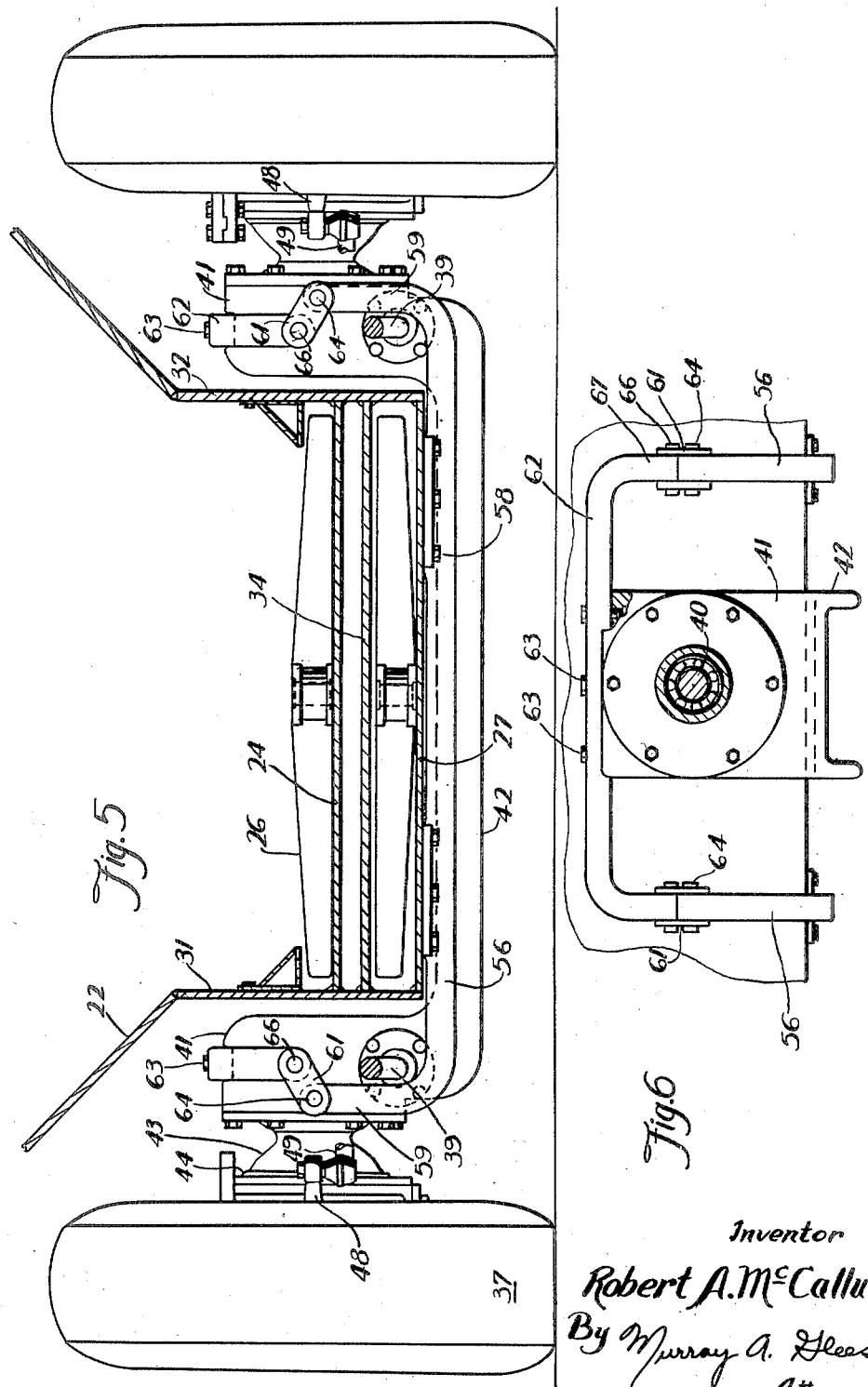

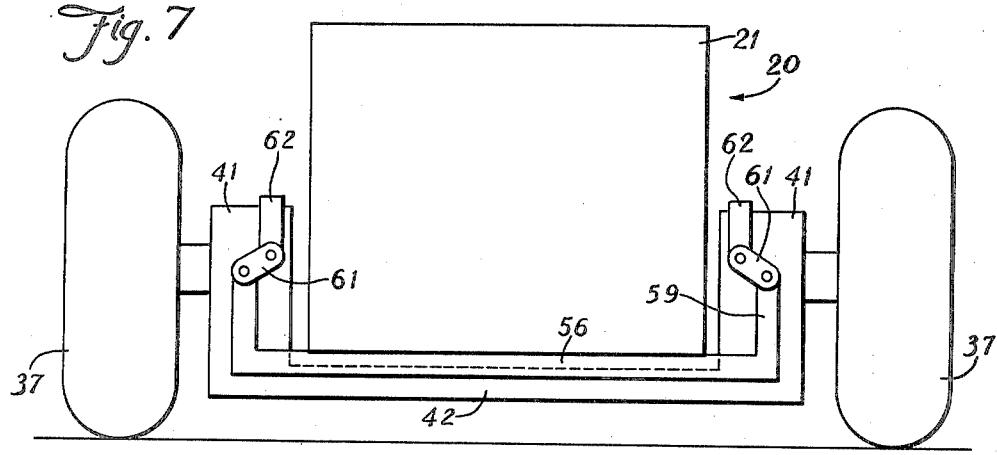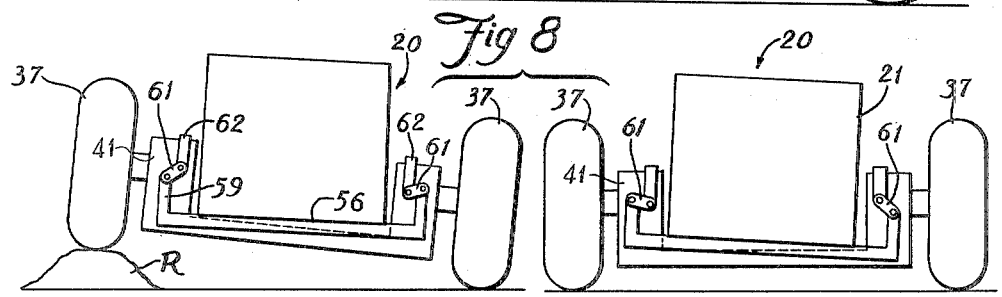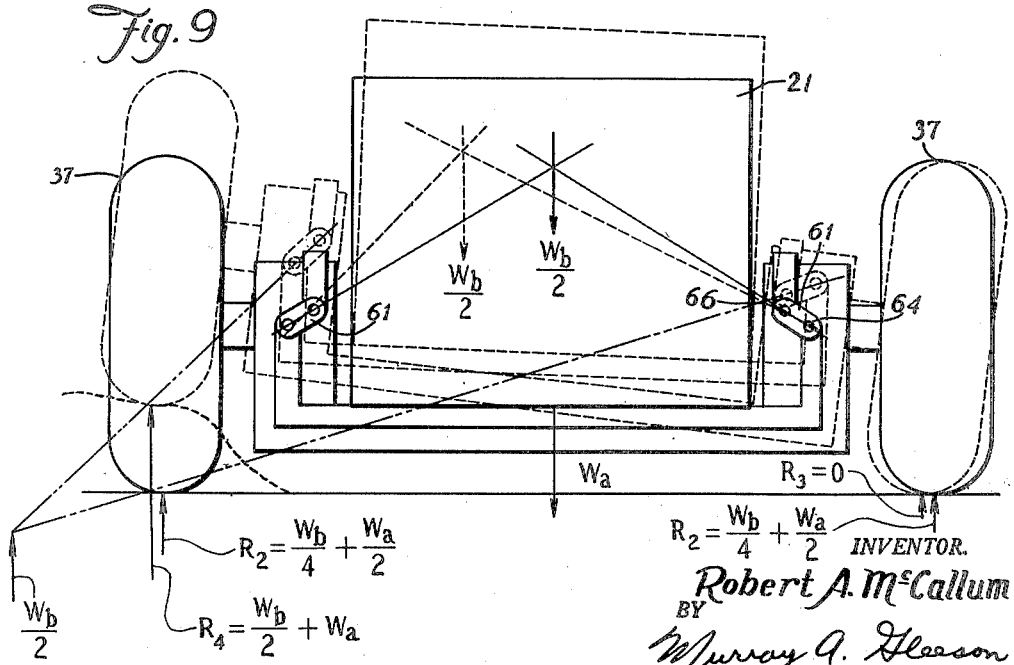

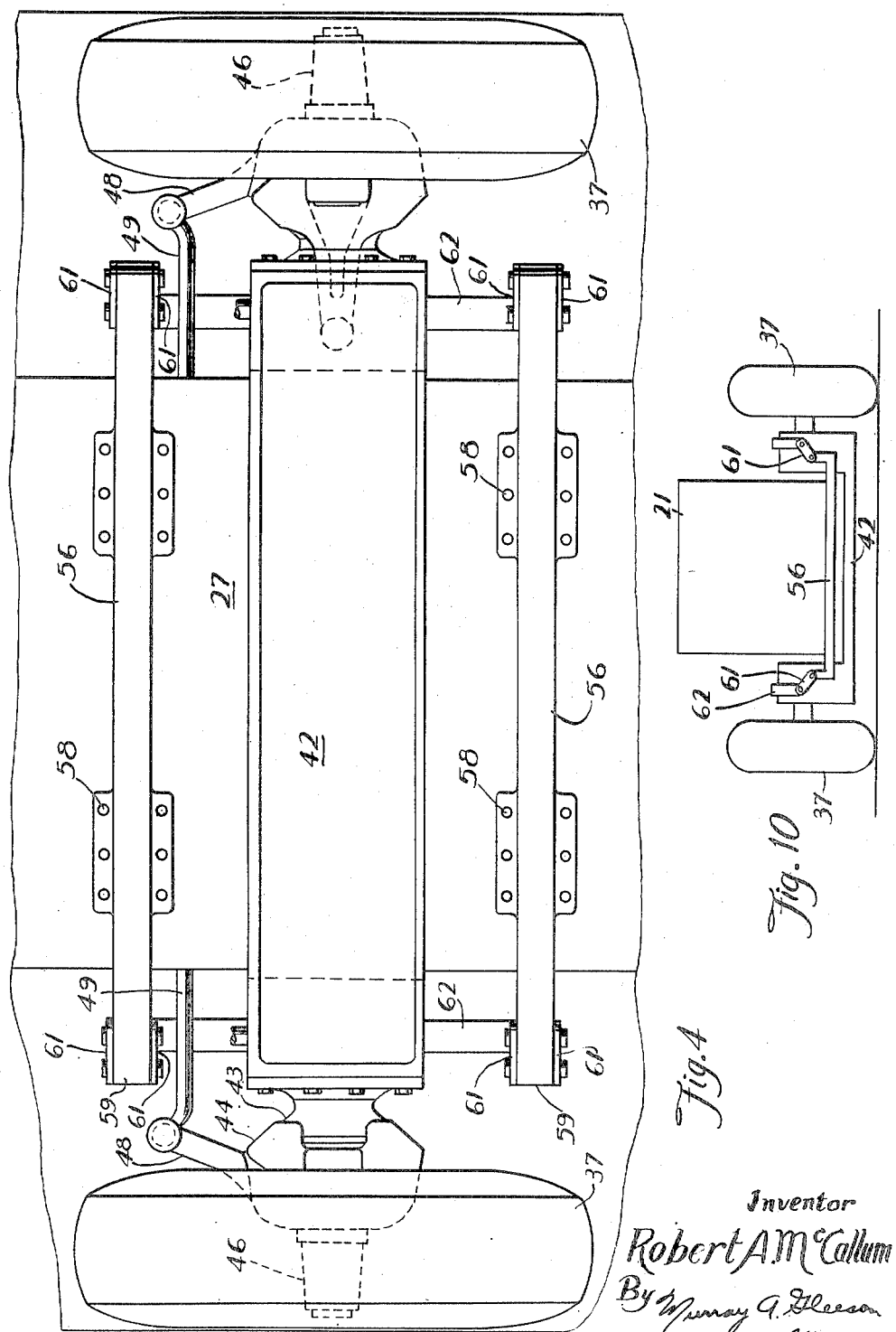

United States Patent Office 2,770,377
Patented Nov. 13, 1956

2,770,377

SUSPENSION FOR VEHICLES SUCH AS SHUTTLE CARS

Robert A. McCallum, Clarendon Hills, Ill., assignor to Goodman Manufacturing Company, Chicago, Ill., a corporation of Illinois Application March 26, 1954, Serial No. 418,806

3 Claims. (Cl. 214—83.36)

This invention relates generally to suspensions for the wheels of a vehicle, and more particularly to an improved wheel suspension for a mine vehicle such as a shuttle car or the like.

In more recent mining methods it has become the practice to employ rubber tired vehicles for transporting coal or other minerals from the working face to a loading station of a belt conveyor or the like. Such vehicles are generally powered from a remote source, and all of the wheels of the vehicle perform both the functions of driving and steering. The confined space in which such vehicles operate makes it unfeasible to provide spring mounting, and in order to accommodate irregularities in the terrain over which the vehicle must operate, it has been the practice to mount either the forward or back set of wheels upon an axle having a pivotal connection at the center of the vehicle, the other pair of wheels being mounted at the ends of an axle held rigidly to the frame or material receiving compartment.

Ordinarily the pivotally mounted wheels are located near the discharge compartment of such vehicle, and in order to accommodate the pivotally mounted axle and its appurtenances it has been necessary to raise the floor of the discharge compartment, thereby resulting in a greatly lessened carrying capacity.

According to the present invention, both the forward and rear pairs of wheels are mounted upon a cross axle which is connected by means of shackles to members underlying the material receiving and discharge sections and rigidly connected to the vehicle frame. The shackles are so arranged that displacement of the wheels is not transmitted totally to the vehicle body as the vehicle moves over irregular terrain. However, such displacement of the wheels effects a lesser degree of displacement of the main frame of the vehicle, and the displacement of the wheels is also accommodated by the shackles at the opposite end of the vehicle, although the wheels at such opposite end may not at such instant be traversing irregular terrain.

The provision of the wheel suspension as described in the foregoing paragraph enables the driving mechanism for each pair of oppositely disposed wheels and the axles for both the forward and rear wheels to be constructed in identical fashion. Moreover, it is possible by the construction according to the present invention to provide a material conveying bed for both the material receiving and discharge compartments lying in substantially an unbroken plane, thereby enabling the vehicle to transport a great deal more material particularly at the discharge section thereof.

The provision of such suspension enables the frame and body to have imposed thereon a torque which is a function of the displacement of one of a pair of connected wheels at one end of the vehicle, and which is counteracted by shifting of the suspension for the other end of the vehicle and frame, even though the other pair of wheels at such instant may not be traversing an irregularity in terrain.

One of the principal objects of the invention is to provide a mine vehicle for transporting fragmented material, and to enable such vehicle to traverse irregular terrain in a manner not possible with the vehicles of the prior art.

Another object of the invention is to provide a suspension for a springless vehicle having load bearing axles, and to suspend the frame of such vehicle in such a fashion that an irregularity in terrain over which the vehicle operates will not appreciably disturb the spaced relationship of the axle to the vehicle frame.

Still another object is to provide a suspension for a springless vehicle having load bearing axles which are spaced but a slight distance from the vehicle frame, said axle being so arranged as to have a relatively large amplitude of movement away from the vehicle frame on one side thereof in order to accommodate an irregularity in terrain, the end of such axle at opposite side of the vehicle being displaced but little relatively in a direction toward the vehicle frame. In the case of a bump in the terrain such movement will take place on the side of the vehicle remote from such bump, while in the case of a depression over which the wheel is traveling such movement will take place on the same side of the vehicle.

Another object is to provide means for mounting the dirigible driving wheels of a shuttle car or the like, which mountings will be identical for both ends of the vehicle, and which will require no substantial requirement or change in the contours of the floor plate of the material receiving and discharge compartment thereof, thereby making it possible for the discharge compartment to be loaded with more material than has been possible heretofore.

Another object is to provide a suspension for a wheeled vehicle, which suspension will enable a wheel encountering an irregularity in terrain to shift its supporting action without the need of a resilient snubbing device.

Yet another object is to suspend the frame and body upon the axles of a springless vehicle, and to enable the axle to be displaced with reference to the frame and body by means of a shift in angular position of shackles connecting the frame and body to the axles, such shift in angular position not disturbing the stability of the frame and body.

Other objects and important features of the invention will be apparent from a study of a specification following taken with the drawings, which together show some preferred embodiments of the invention and what are now intended to be the best modes of practicing the principles thereof. Other embodiments of the invention may be suggested to those having the benefit of the teachings herein, and it is therefore intended that the scope of the invention not be limited by the precise embodiments herein shown, such other embodiments which may be suggested being intended to be expressly reserved particularly as they fall within the purview of the subjoined claims.

In the drawings:

Fig. 1 is a plan view of a mine shuttle car having embodied therein the improvements according to the present invention;

Fig. 2 is a front elevation view thereof;

Fig. 3 is a transverse sectional view to an enlarged scale, taken along the line 3—3 of Fig. 1;

Fig. 4 is a bottom view thereof taken along the line 4—4 of Fig. 3 looking in the direction of the arrows;

Fig. 5 is a view similar to Fig. 3, to the same scale, showing a transverse section taken along the line 5—5 of Fig. 1;

Fig. 6 is a detailed end view of the frame and wheel suspension shown in Figs. 3 and 5, said view being taken along the lines 6—6 of Fig. 3 looking in the direction of the arrows;

Fig. 7 is a schematic view showing the frame and wheel suspension system and the relationship of the frame thereto when the vehicle is traversing level terrain;

Fig. 8 is a schematic view of the frame and wheel suspension of the vehicle, said view being similar to that shown in Fig. 7, showing both the forward and rear suspension means for the respective forward and rear wheels, showing the displacement of the frame when one of the forward wheels is encountering an irregularity in terrain, and showing how the rear suspension means accommodates the shifting in the frame although the rear wheels at such instant are traversing regular terrain;

Fig. 9 is a view similar to Figs. 7 and 8, and illustrating the forces acting on the vehicle when a wheel thereof is encountering an irregularity in terrain; and Fig. 10 is a schematic view showing an alternate method of suspending the frame from the suspension means.

Referring now to the drawings the improvements according to the present invention are embodied in a mine shuttle car referred to generally by the reference numeral 20. Such a vehicle includes a main frame 21, a material receiving compartment 22 and a discharge compartment 23. As seen in Figs. 3 and 5, the material receiving compartment has a floor plate 24 and the discharge compartment has a floor plate 25, over which an endless flight conveyor 26 is arranged to travel longitudinally. The frame 21 also has a lower plate 27 extending between side walls 28 and 29 at the discharge compartment, see Fig. 3, and also extending between side walls 31 and 32 of the material receiving compartment 22, see Fig. 5. The plate 27 provides a path of travel for the return reach of the endless flight conveyor 26 which is additionally guided by a plate 33 spaced above the plate 27 and extending substantially for the length of the discharge compartment 23, and a plate 34 spaced above the plate 27 and extending substantially for the length of the material receiving compartment 22.

As seen in Fig. 2, the discharge compartment 23 may be elevated, by hydraulic means not shown, and arranged to pivot about a horizontal axis so that same may be positioned above a belt conveyor or the like.

The vehicle 20 is provided with dirigible driving wheels 37, a pair of wheels on each side of the vehicle being driven from a motor 35 connected through a gear case 38 to drive shafts 39, see also Figs. 3 and 5, each connected to drive a wheel 37. The shaft 39 is connected to a gear case 41 at each end of an axle 42 which underlies the bottom plate 27 of the vehicle 20, and which is spaced a slight amount therefrom for a reason as will appear as this specification proceeds.

Each gear case 41 has extending therefrom a partly spherical housing 43 which swivels within and with respect to a complementary partly spherical bell housing 44, the two housings 43 and 44 enclosing a universal joint, not shown. Power from the gear case 41 and motor 35 is supplied to each of the wheels 37 through the medium of a shaft 40, the bell housing terminating in a spindle 46, see Fig. 4, which encloses a stub axle 47 extending from the universal joint. The stub axle is suitably connected to the wheel 37 in a manner well known in the art.

Each of the bells 44 is provided with a steering knuckle 48 connected to a drag link 49, connected to a steering pitman arm 51, see Fig. 1. The control of the steering is from a driver's compartment 52 located on one side of the vehicle 20 near the discharge compartment 23 and a steering wheel 53 may be operated at such driving compartment. Hydraulic power assistance for steering may be provided by a power unit 54 seen in Fig. 2.

A pair of transversely extending vehicle weight transmitting members 56 are disposed on each side of each of the axles 42, and are held by cap screws 58 to the underside of the plate 27 of the frame 21. Each vehicle weight transmitting member 56 is substantially in the form of a U and has upstanding end portions 59 which are spaced from the side walls 31 and 32 of the material receiving compartment 22 and from the side walls 28 and 29 of the discharge compartment 23.

The ends of each upstanding arm portion 59 are connected by shackles 61 to an inverted U-shaped stirrup 62 held by cap screws 63 to the top of the gear case 41, see also Fig. 6. As seen in Fig. 6, each shackle 61 has a shackle pin 64 passing through the upstanding arm 59 and also has a shackle pin 66 passing through downward extending limbs 67 of the U-shaped stirrup 62.

The line of centers of the shackle pins 66 and 64 is chosen so as to be inclined at an angle of from 30° to 45° with the horizontal when the vehicle is in a normal rest position the line of centers of opposed shackles intersecting at a point 0 on a plane bisecting the vehicle 20.

Referring now to Fig. 7 of the drawings there is shown a more or less schematic representation of the vehicle suspension means according to the present invention when the vehicle is at rest or traveling over smooth terrain. Fig. 8 shows the change in position of the suspension when the vehicle 20 encounters an irregularity R in the terrain such as a rock in the path of one of the wheels 37. Upon the occurrence of such condition, which condition is of such a value as to illustrate the maximum displacement which can take place without lifting the opposite wheel from the ground, the axle 42 is tilted from the horizontal and the weight transmitting members 56 are tilted approximately one-half the amount of tilt of the axle 42. Between the position seen in Figs. 7 and 8, the vehicle frame and body are tilted through angles equal to one-half the angle of tilt of the axle 42.

It may be noted that the expression "irregularity in terrain" connotes not only the bump R shown but also a depression. Thus, a condition equivalent to that shown in Fig. 8 would be one where a depression is located at the wheel opposite from the wheel encountering the bump R. In the claims the expression "irregularity in terrain" is intended to connote also a depression.

As seen in Fig. 8, such irregularity R will of course raise the gear case 41 and the vehicle weight transmitting member 56 which is connected to the gear case 41 by means of the shackles 61. But such raising in position of the gear case 41 also raises the vehicle frame further above the ground at the side where the irregularity R is encountered. It will be noted that the position of the shackle 61 on such side of the vehicle with respect to the gear case 41 will be changed but a slight amount, but the irregularity and the shifting of the axle 42 is accommodated on the opposite side of the vehicle where the shackles 61 change their position greatly with respect to the opposite gear case 41 and the opposite U-shaped member 62.

An analogous situation of course obtains where the right hand wheel of the front axle encounters a depression.

It may be noted also that such change in angular position of the shackles 61 causes the vehicle body to tilt but one-half of the axle tilt. It will thus be apparent that the vehicle frame will be lifted by the irregularity R, and that the wheels 37 mounted upon the axle 42 may shift with respect to the vehicle body by means of the shackles 61, most of the shifting of the axle 42 being accommodated on the side of the vehicle remote from the irregularity R, as seen by the change in angular position of the shackle 61 remote from such irregularity.

However, the shackles at the other part of wheels shift their position oppositely from the shift in the shackles for the pair of wheels just described. That is to say, if the left front shackle takes the position shown, the right rear shackle will take a corresponding position. Also, the right front shackle, which has been described as shifting its angularity but slightly, will correspond to the left rear shackle.

Such a difference in angular shifting is best seen with reference to Fig. 8 of the drawings. As shown, the relative angular position of the shackles 61 to the stirrups 62 and the arm 59 will not be changed substantially on the side where the irregularity is encountered. However, the angular position of the shackle 61 on the opposite side of the vehicle from the irregularity will be changed as shown. This displacement from the vertical of the vehicle at frame 21 is also accommodated by the suspension structure at the other pair of wheels 37. It will be noted that the shackles 61 at the other pair of wheels have adjusted their angular position in the opposite sense in the manner shown, although such other pair of wheels at such instant may be traversing regular terrain, the left hand shackle of the other pair of wheels taking a position corresponding substantially to the right hand shackle at the front end of the vehicle, while the right hand shackle at the rear end of the vehicle taking a position substantially corresponding with the left hand shackle at the front end of the vehicle.

The shifting or change in angularity of the shackles 61 shown in Figs. 7 and 8 at both the forward and rear wheels may best be described with reference to Fig. 9 which shows the forces acting on the vehicle 20. In the full line position shown in Fig. 9, the vehicle is at rest and the forces acting at one end thereof are one-half the body weight $$\frac{Wb}{2}$$

the axle weight, $Wa$; and the reaction forces at each wheel $$R_2 = \frac{Wb}{4} + \frac{Wa}{2}$$

Since there is no translative movement of the vehicle these forces equate to zero, in a manner well understood.

The weight of the body $$\frac{Wb}{2}$$

at any pair of wheels is resolved through the shackles 61, and during any shifting of the body occasioned by an irregularity in terrain must also be transmitted through such shackles. Since the body is stable upon the shackles 61 such resolution forces must act through the axes of the shackles 61 along their shackle pins 64 and 66.

Upon tilting of the body 21 the weight resultant of the body may be shifted to the left as seen in Fig. 9, the right hand reaction force $$R_2 = \frac{Wb}{4} + \frac{Wa}{2}$$

diminishing while the left hand reaction force increases. It will be seen that the weight resultant $$\frac{Wb}{2}$$

will shift from the center in accordance with the tilt of the vehicle by an irregularity in the surface over which the vehicle travels.

It is possible of course for the vehicle to traverse an irregularity of such magnitude that the reaction force against one of the wheels may become zero in magnitude. Upon the happening of such a condition, as has been previously suggested with reference to Fig. 8, the right hand shackle 61 of Fig. 9 has reversed its angularity and the weight resultant of the body 21 now lies outside of the wheels of the vehicle (by way of example, to the left of the left wheel). The reaction against the left wheel becomes $$R_4 = \frac{Wb}{2} + Wa$$

whilst the reaction against the right wheel is $$R_3 = 0$$

The force component of the axle weight, $Wa$, remains unchanged in location.

Irrespective of the position of the body weight resultant, the forces $$\frac{Wb}{2}$$

and $Wa$ create a torque or moment upon the body 21 which is restrained by a counteracting or restraining torque of an opposite sense which is manifested by the change in position of the shackles at the other pair of wheels, as seen in Fig. 8.

Referring now to Fig. 10, there is shown another embodiment of the invention where the shackles 61 are disposed at a different angular relationship from the shackles shown in Figs. 7 to 9, inclusive. However, it may be noted that irrespective of the change in angular position of the shackles shown in Fig. 10 the wheel end of the shackle in each case is always disposed above the frame end thereof, that is to say the end of the shackle connected to the cross members 56 must always be below the end of the shackle connected to the stirrup 62.

An andantage of the suspension of the present invention lies in the fact that both the front and rear pair of wheels may be constructed identically. Moreover, in each case the axle is freely movable with respect to the frame of the vehicle, thereby making unnecessary the provision of attaching means for the axle to the underside of the vehicle frame. In the case of mine shuttle cars having an elevatable discharge section, it is possible to have the floor plate of the discharge section substantially in the same plane as the floor plate of the material receiving section with consequent greater capacity than has been possible heretofore.

While the ivention has been described in terms of some embodiments which it may assume in practice, the scope thereof is not intended to be limited by the precise embodiments shown, all such other embodiments being intended to be reserved especially as they fall within the scope of the claims here appended.

I claim as my invention:

1. In a mine shuttle car, a frame, a material receiving compartment and an elevatable discharge compartment supported on said frame, a floor plate for each of said compartments, said floor plates lying substantially in the same plane and having an endless flight conveyor movable longitudinally thereof, means for suspending said frame so as to maintain said floor plates in such substantial plane comprising an axle disposed beneath said material receiving compartment and an axle disposed beneath said discharge compartment, each of said axles being spaced from the bottom of said vehicle frame and being arranged to have tilting movement with respect to said vehicle frame upon traverse of said car over irregular terrain, such tilting movement being restricted so as to prevent striking of said vehicle frame, means for enabling such tilting movement comprising members extending laterally of said frame and on each side of said axle, said members being rigidly secured to said vehicle frame, and means affording a connection between the ends of said members and a corresponding end of said axle comprising a stirrup connected to said axle near the end thereof with extensions therefrom substantially in alignment with said laterally extending members, and connecting members pivotally connected to said extensions and to said laterally extending members, said connecting members being angularly disposed to said frame and having their point of connection to said extension higher than the point of connection to said laterally extending member when said vehicle frame is in a normal position; said axle, said laterally extending members and the length of said connecting members being so arranged that the angularity of said connecting members is disturbed but little on one side of the vehicle when one of the wheels is encountering an irregularity in terrain, the angularity of the opposite connecting members changing so as to accommodate the shifting of the axle in accordance with such irregularity in terrain.

2. In a mine shuttle car, a frame, a material receiving compartment and an elevatable discharge compartment supported on said frame, a floor plate for each of said compartments, said floor plates lying substantially in the same plane and having an endless flight conveyor movable longitudinally thereof, means for suspending said frame so as to maintain said floor plates in such substantial plane comprising an axle disposed beneath said material receiving compartment and an axle disposed beneath said discharge compartment, each of said axles being spaced from the bottom of said vehicle and being arranged to have tilting movement with respect to said vehicle frame upon traverse of said car over irregular terrain, means for enabling such tilting movement comprising members extending laterally of said frame and on each side of said axle, said members being rigidly secured to said vehicle frame, and means affording a connection between the ends of said members and a corresponding end of said axle comprising a stirrup connected to said axle near the end thereof with extensions therefrom substantially in alignment with said laterally extending members, and connecting members pivotally connected to said extensions and to said laterally extending members, said connecting members being angularly disposed to said frame and having their point of connection to said extension higher than the point of connection to said laterally extending member when said vehicle frame is in a normal position.

3. In a wheeled vehicle, a frame, an axle disposed beneath said frame and spaced therefrom, means for suspending said vehicle frame in such spaced relationship so as to provide tilting movement of said axle when said vehicle is traversing irregular terrain comprising vehicle weight transmitting members extending laterally of said frame and on each side of said axle, said members being rigidly secured to said vehicle frame, and means affording a connection between the ends of said axle comprising a stirrup connected to said axle near the end thereof with extensions therefrom substantially in alignment with said laterally extending members, and connecting members pivotally connected to said extensions and to said laterally extending members, said connecting members being angularly disposed to said frame and having their point of connection to said extension higher than the point of connection to said laterally extending member when said vehicle frame and said axle are in a normal position; said axle, said weight transmitting members and the dimension of said connecting members being so chosen and arranged that the angularity of said connecting members is disturbed but little on one side of the vehicle when one of the wheels is encountering an irregularity in terrain, the angularity of the opposite connecting members changing so as to accommodate the shifting of the axle in accordance with such irregularity in terrain.

References Cited in the file of this patent

UNITED STATES PATENTS

| | | |
|---|---|---|
| 1,098,816 | Marsh et al. | June 2, 1914 |
| 1,135,939 | Johnson | Apr. 13, 1915 |
| 1,423,002 | Mercier | July 18, 1922 |
| 2,269,452 | Ford | Jan. 13, 1942 |
| 2,316,521 | Lee | Apr. 13, 1943 |
| 2,489,968 | Lyon | Nov. 29, 1949 |
| 2,637,457 | Barrett | May 5, 1953 |